Jan. 16, 1923.

E. BAUER ET AL.
SYSTEM OF ELECTRICAL DISTRIBUTION.
ORIGINAL FILED SEPT. 14, 1917.

WITNESS:
Romaine A. Kinne
Ralph Munden

INVENTORS.
Ernst Bauer
William A. Turbayne
BY Raymond H. Van Nest
ATTORNEY.

Patented Jan. 16, 1923.

1,442,320

UNITED STATES PATENT OFFICE.

ERNST BAUER AND WILLIAM A. TURBAYNE, OF NIAGARA FALLS, NEW YORK, ASSIGNORS TO U. S. LIGHT & HEAT CORPORATION, OF NIAGARA FALLS, NEW YORK, A CORPORATION OF NEW YORK.

SYSTEM OF ELECTRICAL DISTRIBUTION.

Application filed September 14, 1917, Serial No. 191,353. Renewed June 5, 1922. Serial No. 566,098.

*To all whom it may concern:*

Be it known that we, ERNST BAUER and WILLIAM A. TURBAYNE, citizens of the United States, residing at Niagara Falls, in the county of Niagara and State of New York, have invented new and useful Improvements in Systems of Electrical Distribution, of which the following is a specification.

The present invention relates to systems of electrical distribution.

More particularly the invention relates to systems in which a storage battery and translation circuit are adapted to be supplied from an electrical source which changes materially in voltage, as for instance, a generator driven from the axle of a railway train. In such systems it is necessary to make provision for controlling the voltage developed by the generator. It is desirable, however, that the voltage control of the generator should not interfere with the proper building up of said generator when the train is starting from rest or from low speed.

The present invention has for one of its objects the provision of a system in which the generator may be regulated to produce the desired characteristic but in which the proper building up of the generator will not be interfered with.

Further objects will be apparent as the description proceeds.

Referring to the drawings—

Figure 1 represents diagrammatically one embodiment of the present invention.

Figure 2 represents a modified embodiment.

A generator which is adapted to be driven at a variable speed is represented by the numeral 1. Said generator is adapted to supply mains 2 and 3 across which is a circuit 4 containing a storage battery 5 and a circuit 6 containing lamps 7 and a switch 8.

In one of the mains, between the generator 1 and the battery circuit 4, is an automatic switch 9. Said automatic switch may be of any preferred construction. The functions of the automatic switch are well understood and need not be explained herein. It will be sufficient to state that the automatic switch 9 will be closed and held closed as long as the generator 1 is developing a voltage equal to or greater than the C. E. M. F. of the storage battery 5. The generator 1 is provided with a shunt field winding 10. As illustrated in the drawings, said shunt field winding 10 is connected across the terminals of the generator through a compressible pile 11. The compressible pile 11 is illustrated as indicative of any preferred regulating means. Any of the well known regulating mediums may be substituted for said compressible pile 11, if desired. The pile 11 is adapted to be controlled by a bell crank lever 12 which in turn is adapted to be controlled by a plunger 13. A dash-pot 14 may be provided, if desired, for damping movement of the plunger 13.

As illustrated in the drawings, the plunger 13 is adapted to be controlled by a pair of coils 15 and 16. The coil 16 is illustrated as being connected around a resistance 17 in the storage battery circuit 4, whereby said coil 16 will be responsive to changes in the current flowing in said circuit 4.

The regulating coil 15 is connected between the automatic switch 9 and the main 3, through the resistance 18 and the adjustable contact 19. Connected in the storage battery circuit 4 is an ampere hour meter 20 provided with a fixed contact 21 and a movable contact 22. The fixed contact 21 is connected to the resistance 18 through the adjustable contact 23. The movable contact 22 is connected to the main 3. Contacts 21 and 22, when in engagement, are thus adapted to short-circuit an adjustable part of resistance 18. Said ampere hour meter may be of any preferred construction, but should be of a type which automatically changes its rate of registration upon a change in the direction of current flow therethrough. Said ampere hour meter may be calibrated to compensate for the fact that the storage battery has an efficiency of less than 100 per cent whereby said ampere hour meter will at all times indicate the available charge in said storage battery.

A mode of operation of the system illustrated in Fig. 1 is substantially as follows:

When the generator is at rest or is being operated at a speed insufficient to develop a voltage equal to the C. E. M. F. of the storage battery 5, the automatic switch 9 will be open and any demands of the translation circuit 6 will be supplied by the storage battery 5. At this time the regulating coil 15 will be disconnected from the circuit whereby said coil 15 will be inoperative to attract the plunger 13. Said coil 15 will therefore not operate to increase the resistance of the compressible pile 11 and the generator 1 may rapidly build up its voltage. After the generator has developed a sufficient voltage, the automatic switch 9 will close, at which time said coil 15 will be connected across mains 2 and 3 and be in operative condition to perform its regulating functions. The coils 15 and 16 may be designed to produce any desired characteristic of the generator.

When a sufficient number of ampere hours have been delivered to the storage battery 5 to bring said battery to a state of full charge, the movable contact 22 of the ampere hour meter 20 will come into engagement with the fixed contact 21 whereby to form a short circuit about that part of the resistance 18 between the contacts 19 and 23, whereby the effect of the controlling coil 15 will be very much increased. The system may be so designed that the increase in the effect of the controlling coil 15 will be just sufficient to reduce the voltage developed by the generator 1 to a value equal to the normal value of the lamps 7. Though the present invention has been illustrated in connection with an ampere hour meter 20 and with a certain particular means for controlling the regulation responsive to the current in the battery circuit, it is to be understood that the invention is not limited to such a system but is applicable to any system having means for controlling the generator according to the voltage functions.

The system illustrated in Figure 2 carries the invention illustrated in Fig. 1 a step further. In Figure 2 the automatic switch 9 is provided with an auxiliary contact 24 insulated from said automatic switch. Said contact 24 is adapted to bridge the contacts 25 and 26 which are respectively connected to the two ends of the compressible pile 11. It will be evident that when the automatic switch 9 is open, the contacts 24, 25 and 26 will form a short circuit around the compressible pile 11 whereby the shunt field winding 10 will be connected directly across the generator terminals, whereby the least possible interference will be provided for the proper building up of the generator. In Fig. 2, as in Fig. 1, the controlling coil 15 will be disconnected from circuit when the automatic switch 9 is open. It will be connected to perform its functions when the automatic switch is closed.

The described embodiments of the present invention are chosen merely for the purpose of illustration and are not to be considered in a limiting sense. Many modifications may be made therein. It is desired that the patent shall cover all such modifications that come within the scope of the invention as defined by the appended claims.

What we claim as new and desire to secure by Letters Patent of the United States, is—

1. In a system of electrical distribution, a variable speed generator, a regulating medium for said generator, a voltage responsive operating solenoid for said medium, a storage battery, an automatic switch, said automatic switch constituting means for disabling said operating solenoid.

2. In a system of electrical distribution, a variable speed generator, a regulating medium for said generator, an operating solenoid for said medium, a storage battery, an automatic switch, said automatic switch constituting means for simultaneously disabling said operating solenoid and short-circuiting said regulating medium.

3. In a system of electrical distribution, a variable speed generator, a storage battery, a regulating medium for said generator, controlling means for said medium, short-circuiting means for said medium, and means for simultaneously connecting said generator to said battery, connecting said controlling means in circuit and opening said short circuiting means.

4. In a system of electrical distribution, a variable speed generator, a storage battery, a regulating medium for said generator, controlling means for said medium, and means for selectively connecting said battery to said generator and connecting said controlling means in operative circuit or disconnecting both said regulating medium and said controlling means from operative circuit.

In witness whereof, we have hereunto subscribed our names.

ERNST BAUER.
WILLIAM A. TURBAYNE.